United States Patent
Ogino

(10) Patent No.: US 7,365,789 B2
(45) Date of Patent: Apr. 29, 2008

(54) AUTOFOCUS METHOD AND APPARATUS

(75) Inventor: Hiroyuki Ogino, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 882 days.

(21) Appl. No.: 10/655,270

(22) Filed: Sep. 3, 2003

(65) Prior Publication Data

US 2004/0080662 A1 Apr. 29, 2004

(30) Foreign Application Priority Data

Sep. 3, 2002 (JP) ............................ 2002-258075

(51) Int. Cl.
*H04N 5/232* (2006.01)
*H04N 5/222* (2006.01)
(52) U.S. Cl. .................. 348/345; 348/354; 348/333.04
(58) Field of Classification Search ................ 348/346, 348/354, 347, 349, 353, 356, 333.04; 396/103, 396/45, 104
See application file for complete search history.

(56) References Cited

U.S. PATENT DOCUMENTS

| | | | | |
|---|---|---|---|---|
| 5,053,800 A | * | 10/1991 | Ishida et al. | ................... 396/91 |
| 5,352,882 A | * | 10/1994 | Koyanagi et al. | ............. 396/79 |
| 5,448,295 A | * | 9/1995 | Hirota | ........................ 348/345 |
| 5,970,261 A | * | 10/1999 | Ishiguro et al. | ................ 396/85 |
| 6,704,054 B1 | * | 3/2004 | Hashimoto | ................... 348/354 |
| 6,750,914 B2 | * | 6/2004 | Sannoh et al. | .............. 348/346 |
| 2002/0149689 A1 | * | 10/2002 | Sannoh et al. | ......... 348/333.02 |
| 2003/0117517 A1 | * | 6/2003 | Ogino | ........................ 348/356 |

FOREIGN PATENT DOCUMENTS

| | | |
|---|---|---|
| JP | A 07-218813 | 8/1995 |
| JP | A 11-064717 | 3/1999 |
| JP | A 2001-174260 | 6/2001 |
| JP | A 2001-249267 | 9/2001 |
| JP | A 2003-241066 | 8/2003 |

\* cited by examiner

*Primary Examiner*—David Ometz
*Assistant Examiner*—Luong T. Nguyen
(74) *Attorney, Agent, or Firm*—Morgan & Finnegan, LLP

(57) ABSTRACT

An object of this invention is to provide an autofocus method and apparatus capable of always performing proper focusing operation. To achieve this object, a control device drives a focus lens in accordance with the operation of an operation device, and stores the stop position of the focus lens. While the focus lens is driven within a predetermined range using the stop position as a reference, the control device stores an output from an extraction device in association with the position of the focus lens. The control device determines the focusing state of the focus lens from the output from the extraction device, and when determining from the determination result that the focus lens is incapable of focusing, drives the focus lens to the stop position.

6 Claims, 13 Drawing Sheets

FIG. 5

|  | IN-FOCUS SOUND | IN-FOCUS DISPLAY |
|---|---|---|
| IN-FOCUS "OK" | TWICE | GREEN |
| IN-FOCUS "NG" | ONCE | YELLOW |
| MF | THREE TIMES | WHITE |

F I G. 11
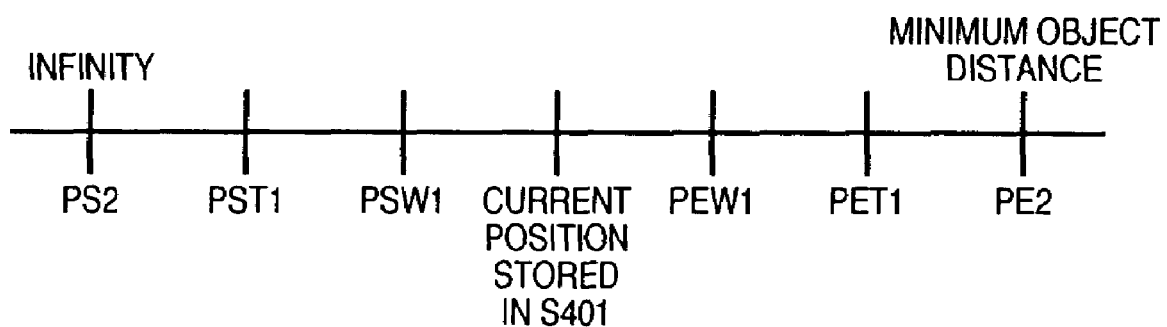

AUTOFOCUS METHOD AND APPARATUS

FIELD OF THE INVENTION

The present invention relates to an autofocus method and apparatus in an image sensing apparatus such as an electronic still camera.

BACKGROUND OF THE INVENTION

In an autofocus apparatus such as an electronic still camera or video camera, a lens position where the high-frequency component of a luminance signal obtained from an image sensing element such as a CCD maximizes is set as an in-focus position. Known examples of this method are a hill-climbing method of moving the lens in a direction in which the high-frequency component (to be referred to as a focus evaluation value hereinafter) of a luminance signal obtained from an image sensing element and setting as an in-focus position a position where the focus evaluation value maximizes, and a scan method of storing focus evaluation values while driving the lens in the entire distance measurement range and setting as an in-focus position a lens position corresponding to the maximum value among stored values.

According to these methods, the central portion of a photographing window is generally set as a distance measurement frame, as shown in FIG. 12. A lens position where the focus evaluation value maximizes for an object to be photographed within the range is defined as an in-focus position. The obtained lens position and focus evaluation value draw an upwardly convex curve as shown in FIG. 13.

When no upwardly convex curve as shown in FIG. 13 can be obtained due to low object contrast and an in-focus position cannot be calculated, the focus lens is moved to a predetermined position. In many cases, the predetermined position is set to a position where an object exists at high probability, or a so-called hyperfocal position including infinity on the far side of the depth of field.

Some cameras have both a manual focus function of manually adjusting the focus position by the photographer, and an autofocus function, and allow the photographer to select either function. In such camera, there is known a method of roughly adjusting the focus by the photographer by manual focusing, and then scanning a narrow range before and after the focus lens position by autofocusing to finely adjust the focus.

If the in-focus position cannot be calculated because of low object contrast when a range before and after the position adjusted by manual focusing is scanned by autofocusing, moving the focus lens to a predetermined position set in the above way may greatly change the focus position roughly adjusted by the photographer.

For example, assume that the above-mentioned predetermined position is set to a hyperfocal position, and the photographer moves the focus lens close to the minimum object distance position within a focusable range. In this case, if the in-focus position cannot be calculated due to low object contrast upon autofocusing, the lens is undesirably moved to a hyperfocal position. That is, the lens moves close to infinity though the photographer has manually moved the lens to the minimum object distance position. The focus then greatly deviates from an object to be photographed by the photographer, and fine adjustment of the focus position greatly changes the focus position.

SUMMARY OF THE INVENTION

The present invention has been made in consideration of the above situation, and has as its object to provide an autofocus method and apparatus capable of always performing proper focusing operation.

To solve the above problems and achieve the above object, according to the first aspect of the present invention, an autofocus apparatus is characterized by comprising a focus lens which adjusts a focus on an object image, a focus lens driving device which drives the focus lens, a photoelectric conversion device which converts the object image formed by the focus lens into an electrical signal, an extraction device which extracts a signal representing a frequency component of an object brightness from an output signal from the photoelectric conversion device, an operation device for performing various input operations to the apparatus, and a control device which controls apparatus operation, wherein the control device drives the focus lens in accordance with an operation of the operation device, stores a stop position of the focus lens, while driving the focus lens within a predetermined range using the stop position as a reference, stores an output from the extraction device in association with a position of the focus lens, determines a focusing state of the focus lens from the output from the extraction device, and when determining from a determination result that the focus lens is incapable of focusing, drives the focus lens to the stop position.

According to the second aspect of the present invention, an autofocus method of adjusting a focus on an object image obtained via an optical system is characterized by comprising driving a focus lens in accordance with an operation of an operation device to store a stop position of the focus lens, while driving the focus lens within a predetermined range using the stop position as a reference, extracting a signal representing a frequency component of an object brightness by an extraction device, storing an output from the extraction device in association with a position of the focus lens to determine a focusing state of the focus lens from the output from the extraction device, and when the focus lens is determined from a determination result to be incapable of focusing, driving the focus lens to the stop position.

According to the third aspect of the present invention, an image sensing apparatus which can photoelectrically convert an object image obtained via an optical system and store image data in a recording medium is characterized by comprising the autofocus apparatus, wherein the object image on which a focus is adjusted by the autofocus apparatus is sensed.

According to the fourth aspect of the present invention, the storage medium is a computer-readable storage medium which stores a program for causing a computer to function as each device described above.

According to the fifth aspect of the present invention, the storage medium is a computer-readable storage medium which stores a program for executing the processing sequence.

According to the present invention, the focus can be finely adjusted by performing autofocus operation using, as a scan range, a narrow range before and after a focus position adjusted to a certain degree by the photographer in manual focusing. When focusing is incapable, the focus lens is driven to a position before the start of autofocusing. Even if, therefore, focusing is incapable, the focus position does not greatly deviate from a focus adjusted to a certain degree by the photographer.

The in-focus display and in-focus sound are changed between normal autofocusing and fine autofocusing in manual focusing. The photographer can be easily notified of the current focus mode setting. In addition, the scan range of fine autofocusing in manual focusing is changed in accordance with the zoom lens position. The focus can be adjusted to an object at the same distance regardless of the zoom lens position.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 5 is a table showing in-focus sound and an in-focus display in FIG. 4;

FIG. 11 is a view for explaining the distance measurement range set in FIG. 10;

DETAILED DESCRIPTION OF THE PREFERRED EMBODIMENTS

Preferred embodiments of the present invention will be described below with reference to the accompanying drawings.

First Embodiment

Figure 1:
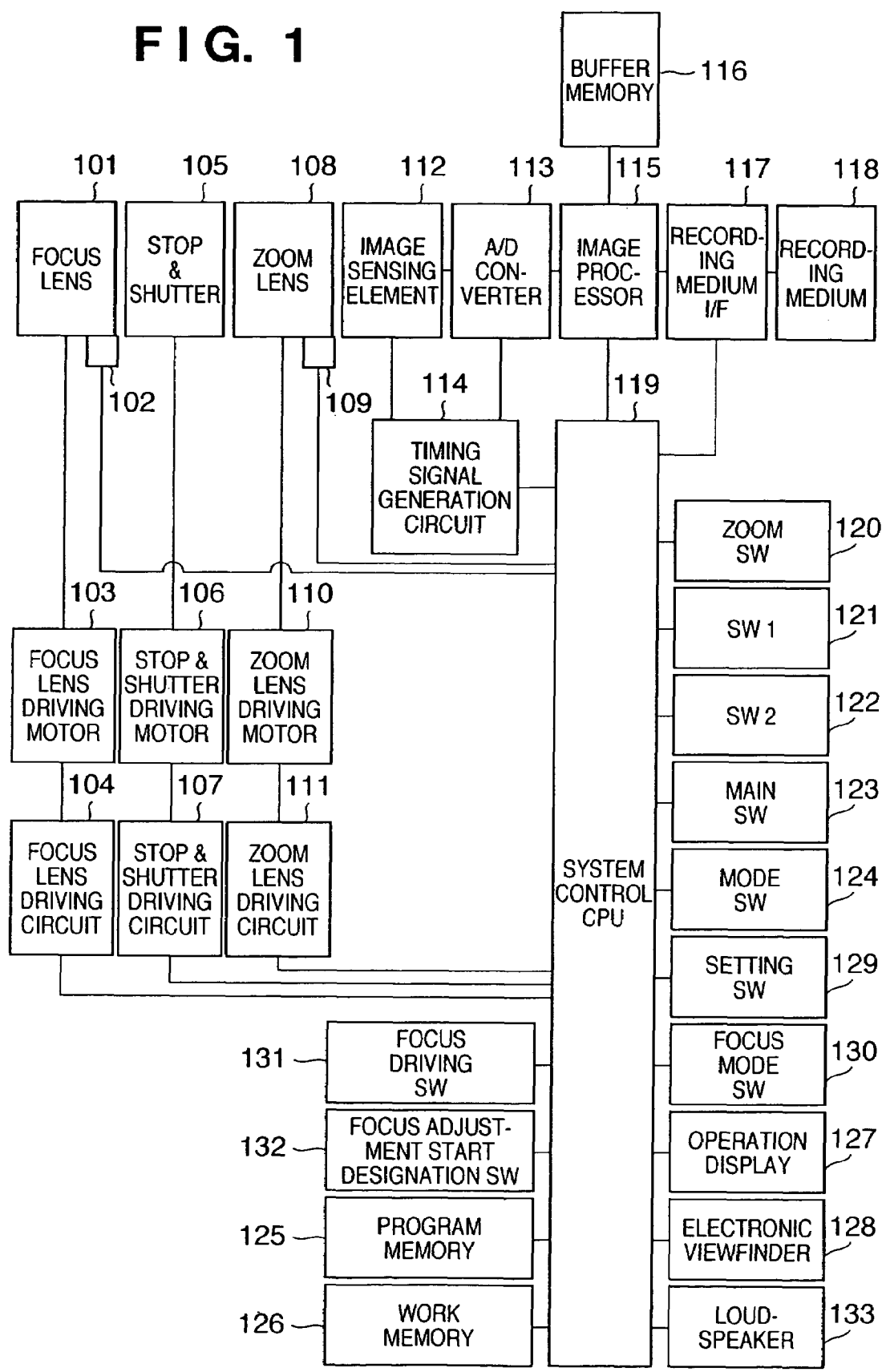
FIG. 1 is a block diagram showing a digital camera according to an embodiment of the present invention.

FIG. 1 is a block diagram showing a digital camera to which the present invention is applied. Reference numeral 101 denotes a focus lens for adjusting the focus onto an image sensing element to be described later; 102, a photointerrupter which detects the initial position of the focus lens 101; 103, a motor which drives the focus lens 101; 104, a focus lens driving circuit which inputs a driving signal to the motor 103 to move the focus lens 101; 105, a light quantity control member such as a stop and shutter; 106, a motor which drives the stop & shutter 105; 107, a stop & shutter driving circuit which inputs a driving signal to the motor 106 to move the stop & shutter 105; 108, a zoom lens which changes the focal length of a photographing lens; 109, a photointerrupter which detects the initial position of the zoom lens 108; 110, a motor which drives the zoom lens 108; and 111, a zoom lens driving circuit which inputs a driving signal to the motor 110 to move the zoom lens 108.

Reference numeral 112 denotes an image sensing element which converts light reflected by an object to be photographed into an electrical signal; 113, an A/D converter which converts an analog signal output from the image sensing element 112 into a digital signal; 114, a timing signal generation circuit (to be referred to as a TG hereinafter) which generates a timing signal necessary to operate the image sensing element 112 and A/D converter 113; 115, an image processor which performs predetermined processing for image data input from the A/D converter 113; 116, a buffer memory which temporarily stores image data processed by the image processor 115; 117, an interface for connecting a recording medium to be described later; and 118, a recording medium such as a memory card or hard disk.

Reference numeral 119 denotes a microcontroller (to be referred to as a CPU hereinafter) for controlling a system such as a photographing sequence; 120, a zoom SW which inputs to the CPU 119 a signal which designates the start and stop of zoom operation; 121, a switch (to be referred to as a SW 1 hereinafter) for designating photographing preparations such as AF and AE; 122, a photographing processing designation switch (to be referred to as a SW 2 hereinafter) for designating photographing processes such as actual exposure and recording operation after the operation of the photographing preparation designation switch 121; 123, a main switch for powering on the system; and 124, a mode switch which sets a camera operation mode.

Reference numeral 125 denotes a program memory which stores a program to be executed by the CPU 119; 126, a work memory for writing and reading out various data necessary for the CPU 119 to perform processing in accordance with a program stored in the program memory 125; 127, an operation display which displays a camera operation state and various warnings; 128, an electronic viewfinder (to be referred to as an EVF hereinafter) which displays an image; 129, a setting switch which performs various settings; 130, a focus mode switch which switches between autofocusing and manual focusing; 131, a focus lens driving designation switch for designating driving of the focus lens 101 by manual operation; 132, a switch which designates the start of focus adjustment; and 133, a loudspeaker for generating various warning sounds, operation sounds, and voice.

The electronic camera of the present invention will be explained with reference to the flow chart of FIG. 2. In step S201, the state of the SW 1 which designates photographing preparations is determined. If the SW 1 is ON, the flow advances to step S205; if NO, to step S202. In step S202, AE operation is done by controlling the stop 105 and shutter speed so as to optimize the brightness of an image displayed on the EVF 128. In step S203, AWB (Auto White Balance) operation is so performed as to adjust the image displayed on the EVF 128 to a proper color balance regardless of the color temperature of the light source. In step S204, predetermined processing is performed for an image signal read out from the image sensing element 112, and the resultant image is displayed on the EVF 128. In step S205, photographing processing is executed in accordance with a sequence to be described later.

In step S206, whether the focus mode has been set to manual focusing by the focus mode SW 130 is determined. If YES in step S206, the flow advances to step S207; if NO, to step S201. In step S207, the state of the focus driving SW 131 is determined. If the SW 131 is ON, the flow advances to step S210; if NO, to step S208. In step S208, the state of the focus adjustment start designation SW 132 is determined. If the SW 132 is ON, the flow advances to step S209;

if NO, to step S201. In step S209, AF processing is executed in accordance with a sequence to be described later. In step S210, the focus lens 101 is driven in accordance with the operation state of the focus driving SW 131.

Figure 2:
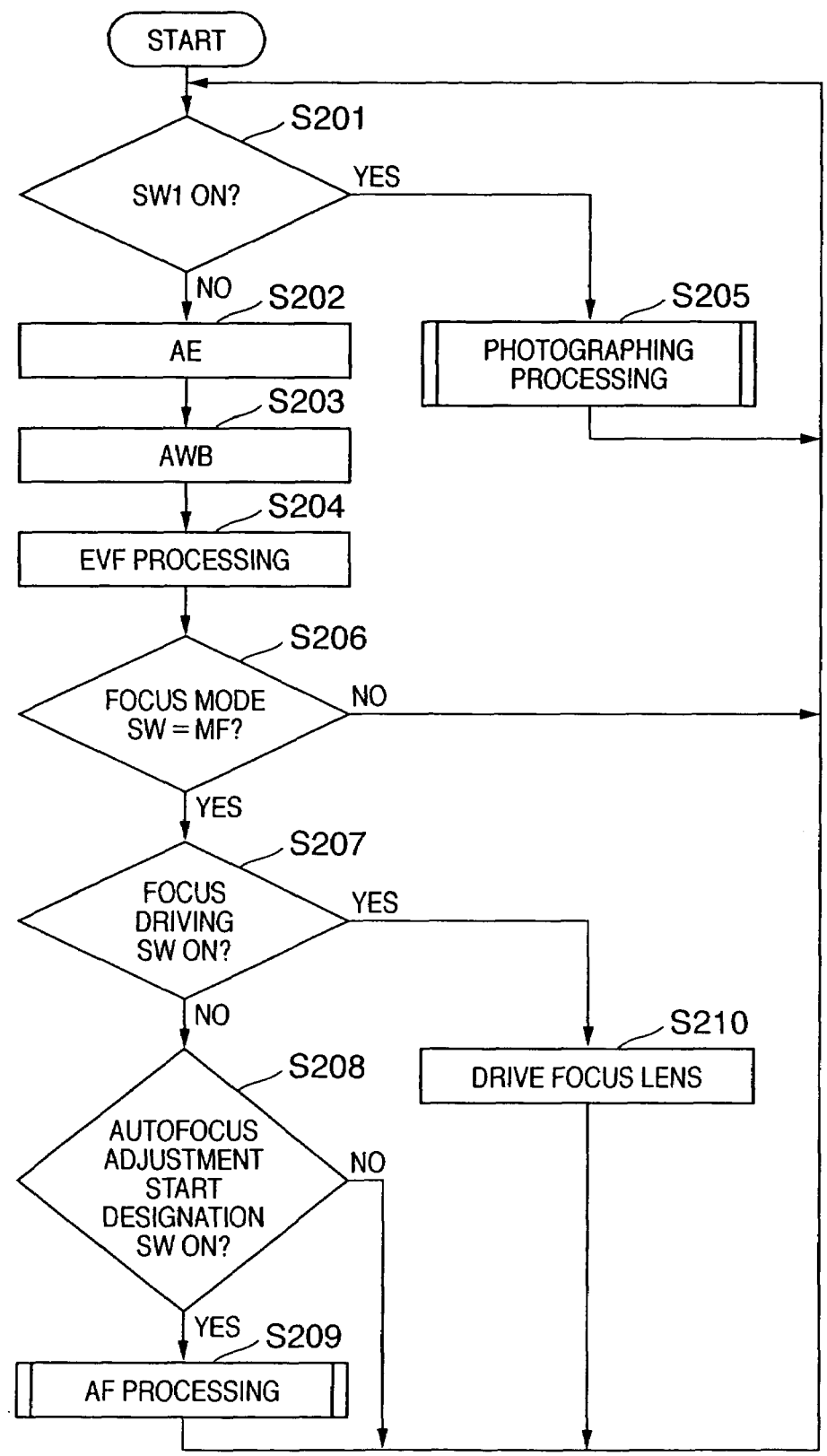
FIG. 2 is a flow chart showing the basic operation of the electronic camera according to the embodiment of the present invention.
Figure 3:
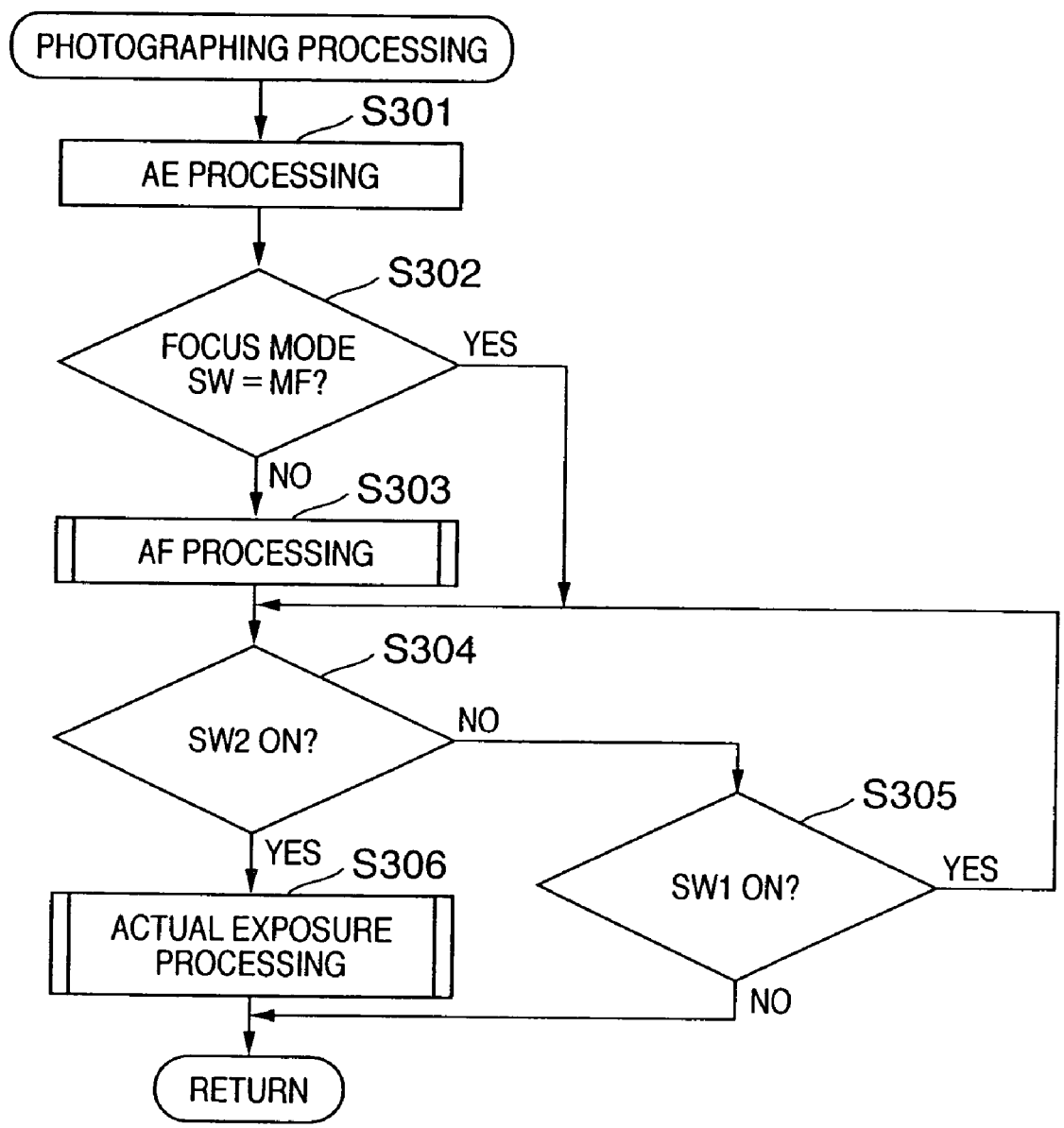
FIG. 3 is a flow chart showing photographing processing in FIG. 2.

FIG. 3 is a flow chart for explaining photographing processing in step S205 of FIG. 2. In step S301, AE processing for actual exposure is done. In step S302, whether the focus mode has been set to manual focusing by the focus mode SW 130 is determined. If YES in step S302, the flow advances to step S303; if NO, to step S304. In step S303, AF processing for actual exposure is executed in accordance with a sequence to be described later. In step S304, actual exposure and recording are done in accordance with a sequence to be described later.

Figure 4:
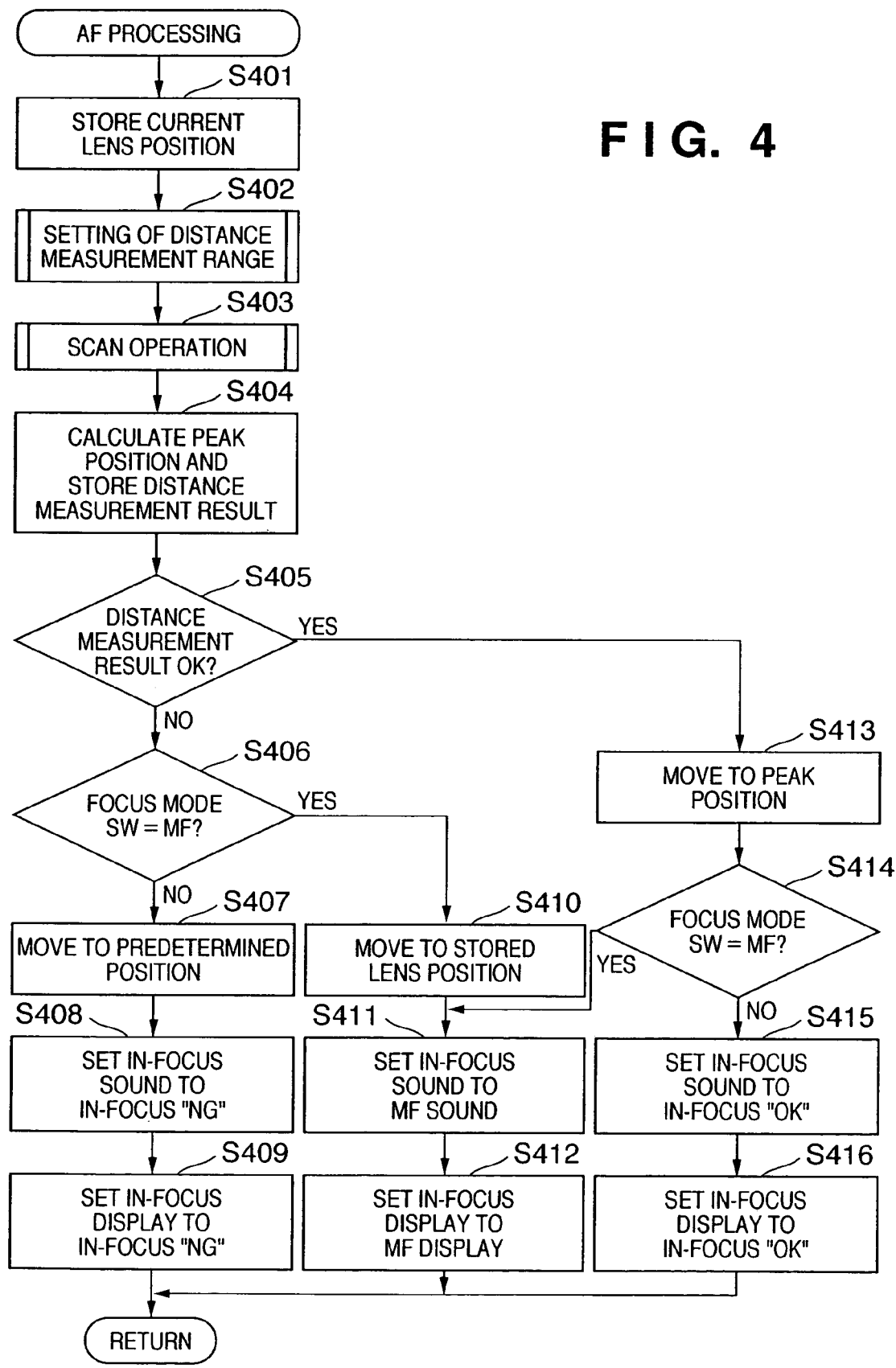
FIG. 4 is a flow chart showing AF processing for actual exposure in FIG. 3.

FIG. 4 is a flow chart for explaining AF processing in step S209 of FIG. 2 and step S302 of FIG. 3. In step S401, the current position of the focus lens 101 is stored in the work memory 126. When the focus lens driving motor 103 is a stepping motor, the position of the focus lens 101 is defined by a relative driving pulse count from an initial position detected by the photointerrupter 102. An absolute position may be measured using a rotary encoder (not shown) or the like.

In step S402, a distance measurement range is set in accordance with a sequence to be described later. In step S043, scan operation is performed in accordance with a sequence to be described later. In step S404, predetermined calculation is executed for an AF evaluation value obtained by scan operation in step S403. If the focus peak value can be calculated, the calculated focus peak position is stored in the work memory 126, and the distance measurement result is stored as "OK". If no focus peak position can be calculated due to low object contrast or the like, the distance measurement result is stored as "NG" in the work memory 126.

If the distance measurement result stored in step S404 is determined in step S405 to be "OK", the flow advances to step S413; if "NG", to step S406. In step S406, whether the focus mode has been set to manual focusing by the focus mode SW 130 is determined. If YES in step S406, the flow advances to step S410; if NO, to step S407. In step S407, the focus lens 101 is moved to a predetermined position. In step S408, the in-focus sound is set to in-focus "NG" sound. In step S409, the in-focus display is set to an in-focus "NG" display.

In step S410, the focus lens 101 is moved to the position stored in step S401. In step S411, the in-focus sound is set to MF sound. In step S412, the in-focus display is set to an MF display.

In step S413, the focus lens 101 is moved to the focus peak position calculated in step S404. That is, if the focus mode is the manual focus mode, the focus lens 101 is moved to a position set before the start of AF processing. This is because, if the position of the focus lens 101 moved when the focus mode is the manual focus mode but the distance measurement result is "NG" is set to a predetermined position, like step S407, the focus may greatly deviate from a position adjusted to a certain degree by the photographer. To prevent this, the focus lens 101 is moved to a position set at the start of AF processing, like step S413. In this case, even if the distance measurement result is "NG", the focus does not deviate from a position adjusted to a certain degree by the photographer.

In step S414, whether the focus mode has been set to manual focusing by the focus mode SW 130 is determined. If YES in step S414, the flow advances to step S411; if NO, to step S415. In step S415, the in-focus sound is set to in-focus "OK" sound. In step S416, the in-focus display is set to an in-focus "OK" display.

In steps S408, S411, and S415 of FIG. 4, settings of in-focus sound are changed in accordance with the distance measurement result and focus mode. These settings are discriminated by changing the number of beeps generated from the loudspeaker 133. In steps S409, S412, and S416, settings of the in-focus display are changed in accordance with the distance measurement result and focus mode. These settings are discriminated by changing an in-focus mark displayed on the EVF 128.

FIG. 5 shows an example. For in-focus "OK", the in-focus sound is generated twice, and the in-focus display is green. For in-focus "NG", the in-focus sound is generated once, and the in-focus display is yellow. For MF, the in-focus sound is generated three times, and the in-focus display is white. By changing the in-focus sound and in-focus display in accordance with the distance measurement result and focus mode, the photographer can be notified whether focusing operation is successful or the distance is measured in the autofocus mode. This can prevent any failure or operation error.

Figure 6:
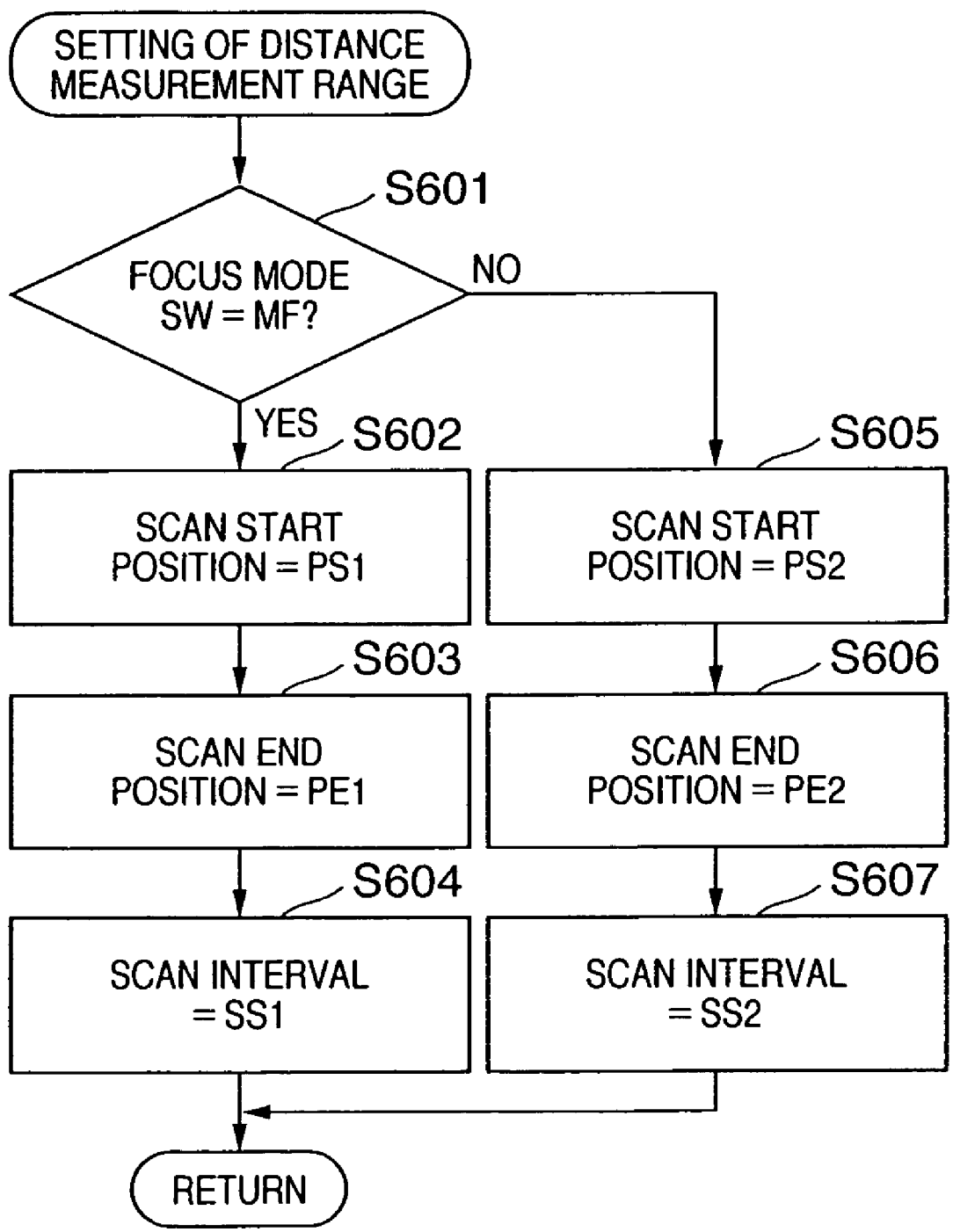
FIG. 6 is a flow chart for explaining setting of the distance measurement range in FIG. 4.

FIG. 6 is a flow chart for explaining setting of the distance measurement range in step S402 of FIG. 4. In step S601, whether the focus mode has been set to manual focusing by the focus mode SW 130 is determined. If YES in step S601, the flow advances to step S602; if NO, to step S605. In step S602, the scan start position is set to PS1. In step S603, the scan end position is set to PE1. In step S604, the scan interval as a focus lens position interval for acquiring a focus evaluation value is set to SS1. PS1, PE1, and SS1 will be described later.

In step S605, the scan start position is set to PS2. In step S606, the scan end position is set to PE2. In step S607, the scan interval is set to SS2. PS2, PE2, and SS2 will also be described later.

Figure 7:
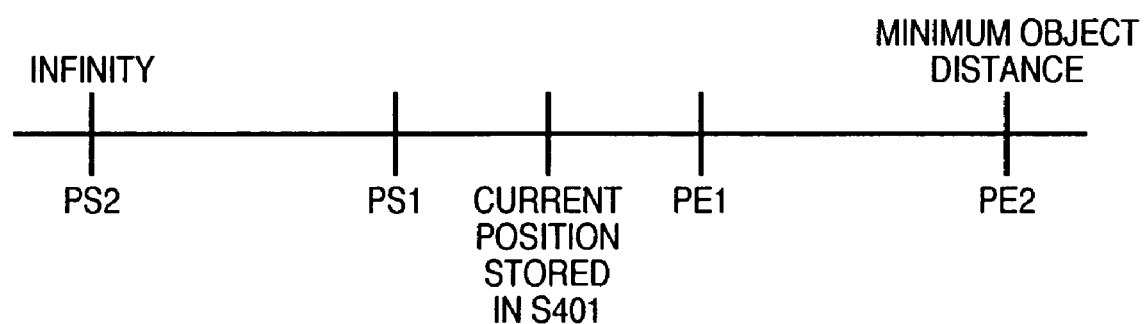
FIG. 7 is a view for explaining the distance measurement range set in FIG. 6.

PS1, PE1, PS2, and PE2 in steps S602, S603, S605, and S606 have a positional relationship as shown in FIG. 7. More specifically, PS2 is infinity in the focusable range, and PE2 is the minimum object distance. PS1 is positioned closer to the minimum object distance than PS2, and PE1 is positioned closer to infinity than PE2. The distance measurement range from PS1 to PE1 is narrower than that from PS2 to PE2. Hence, if the focus mode has been set to manual focusing by the focus mode SW 130, a narrow range is scanned. If manual focusing is not set, a wide range is scanned.

PS1 and PE1 are set with a predetermined range before and after the position of the focus lens 101 moved in step S210 of FIG. 2. In other words, a narrow range before and after the position of the focus lens 101 moved by operating the focus driving SW 131 by the photographer is scanned in the manual focus mode. The focus position to an object to be photographed by the photographer can be finely adjusted.

In the autofocus mode, the distance of an object to be photographed by the photographer is not obtained. For this reason, the scan start position=infinity and the scan end position=minimum object distance are set to scan the entire in-focus range. With these settings, the focus can be reliably adjusted to an object at any distance.

The scan interval in the manual focus mode is set smaller than that in the autofocus mode (SS1<SS2). In manual focusing, the focus can be more accurately adjusted.

Figure 8:
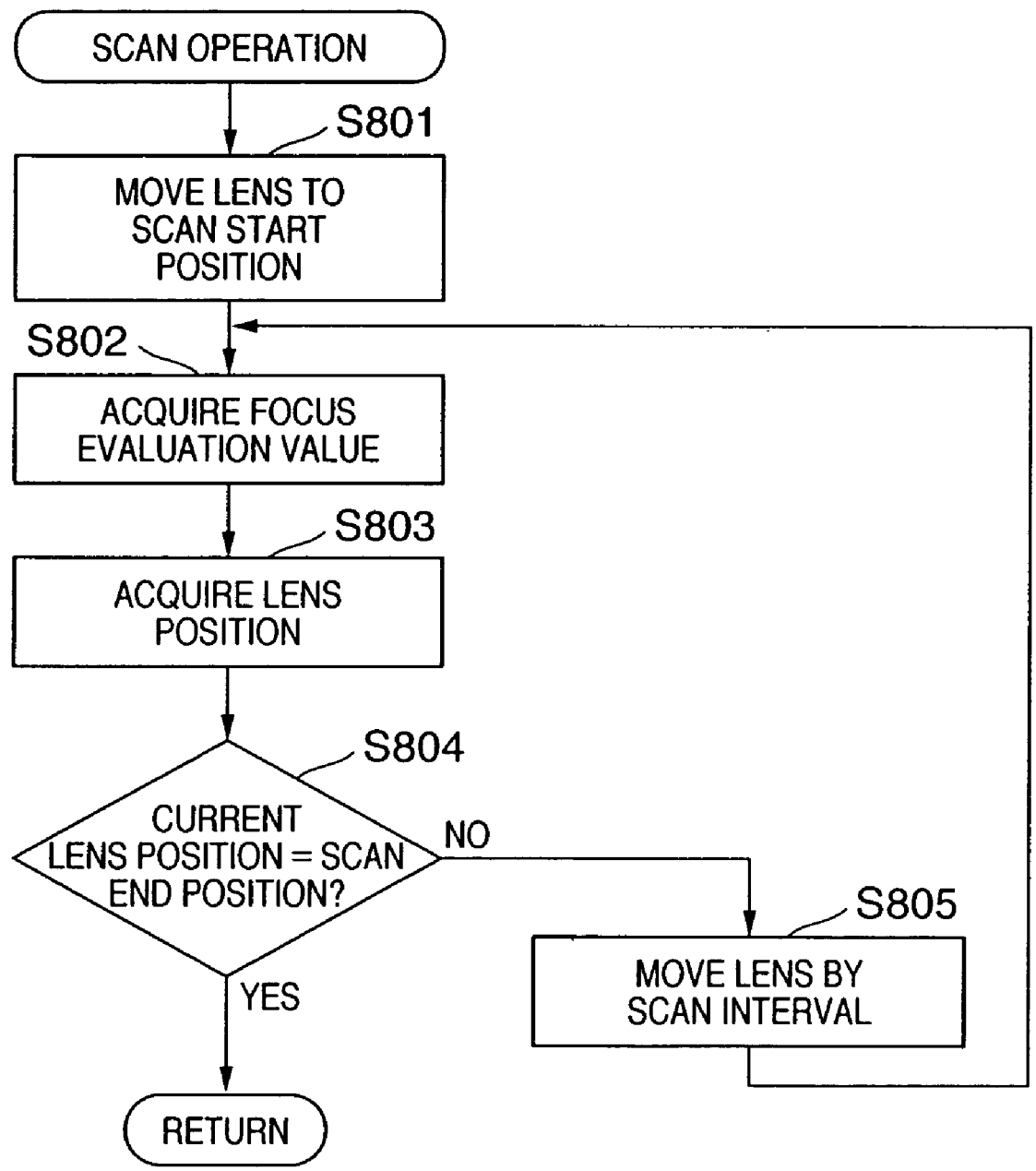
FIG. 8 is a flow chart for explaining scan operation in FIG. 4.

FIG. 8 is a flow chart for explaining scan operation in step S403 of FIG. 4. In step S801, the focus lens 101 is moved to a scan start position. The scan start position is PS1 or PS2 described with reference to the flow chart of FIG. 6. In step S802, an analog image signal read out from the image sensing element 112 is converted into a digital signal by using the A/D converter 113. The high-frequency component of a luminance signal is extracted from an output from the A/D converter 113 by the image processor 115, and stored as a focus evaluation value in the work memory 126. In step S803, the current position of the focus lens 101 is acquired and stored in the work memory 126.

When the focus lens driving motor 103 is a stepping motor, the position of the focus lens 101 is defined by a relative driving pulse count from an initial position detected by the photointerrupter 102. An absolute position may be measured using a rotary encoder (not shown) or the like. In step S804, whether the current position of the focus lens 101 coincides with the scan end position is determined. If NO in step S804, the flow advances to step S805; if YES, scan operation ends. The scan end position is PE1 or PE2 described with reference to the flow chart of FIG. 6. In step S805, the focus lens 101 is moved by the scan interval toward the scan end direction. The scan interval is SS1 or SS2 described with reference to the flow chart of FIG. 6.

Figure 9:
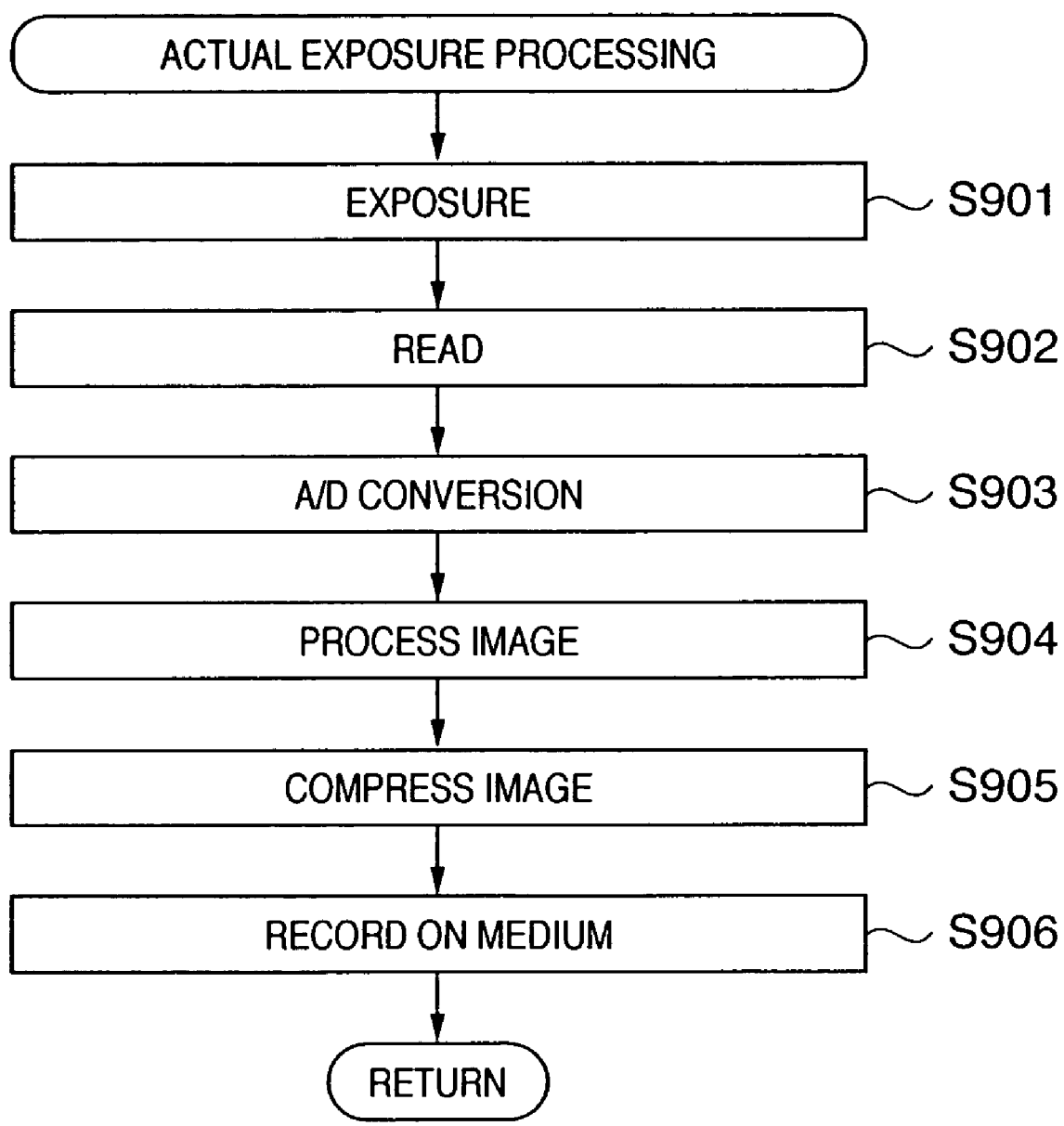
FIG. 9 is a flow chart for explaining actual exposure processing in FIG. 3.

FIG. 9 is a flow chart for explaining actual exposure processing in step S304 of FIG. 3. In step S901, exposure to the image sensing element 112 is performed. In step S902, data stored in the image sensing element 112 is read out. In step S903, an analog signal read out from the image sensing element 112 is converted into a digital signal by using the A/D converter 113. In step S904, various image processes are executed for the digital signal output from the A/D converter 113 by using the image processor 115. In step S905, the image processed in step S904 is compressed in accordance with a format such as JPEG. In step S906, the data compressed in step S905 is recorded via the recording medium interface 117 on the recording medium 118 such as a memory card mounted in the electronic camera main body.

Second Embodiment

In the above description, one scan start position, one scan end position, and one scan interval are set when the focus mode is the manual focus mode. The scan start position, scan end position, and scan interval may be changed in accordance with the position of the zoom lens 108. Processing for this setting will be explained.

Figure 10:
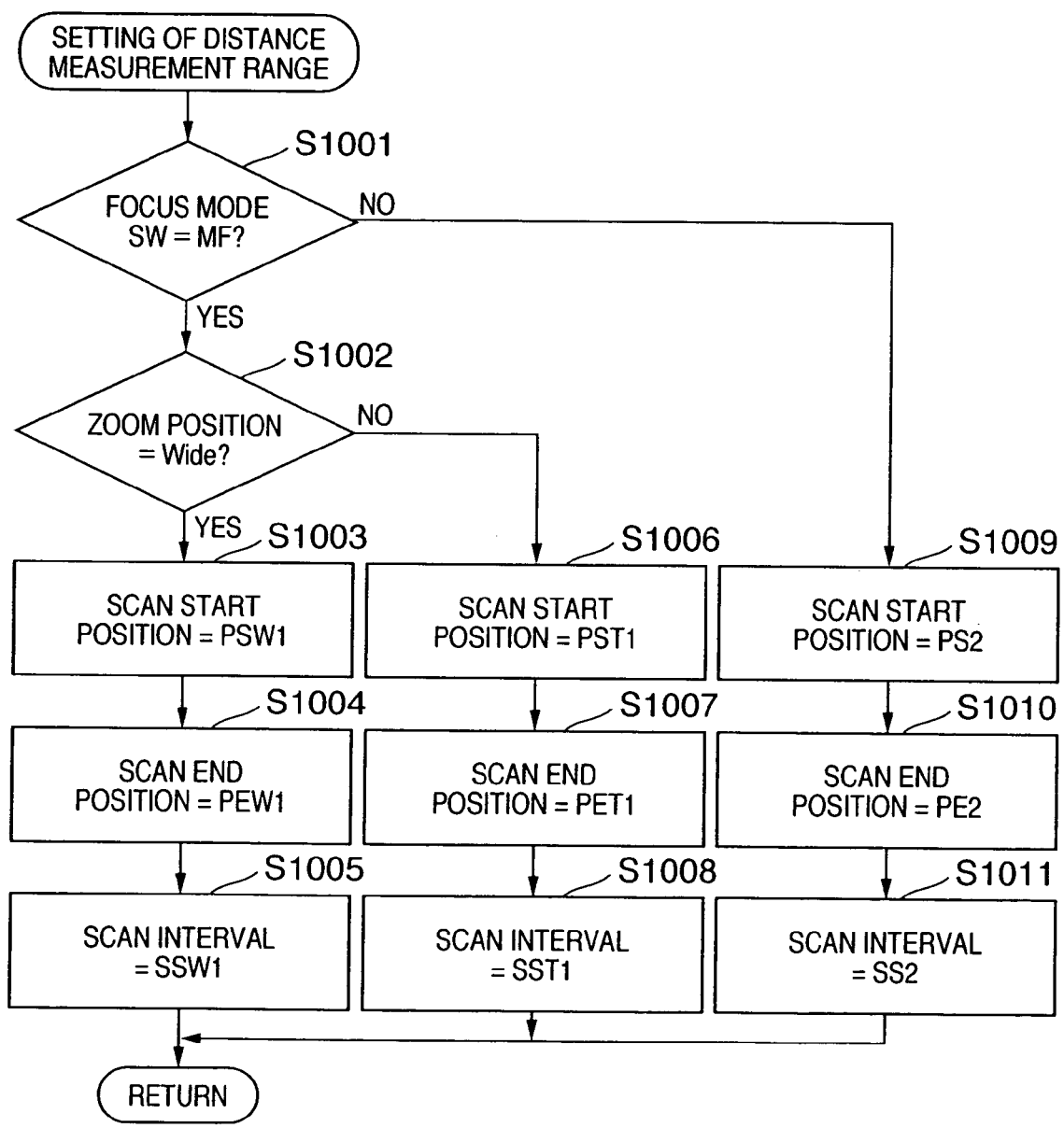
FIG. 10 is a flow chart for explaining setting of the distance measurement range according to the second embodiment of the present invention.
Figure 12:
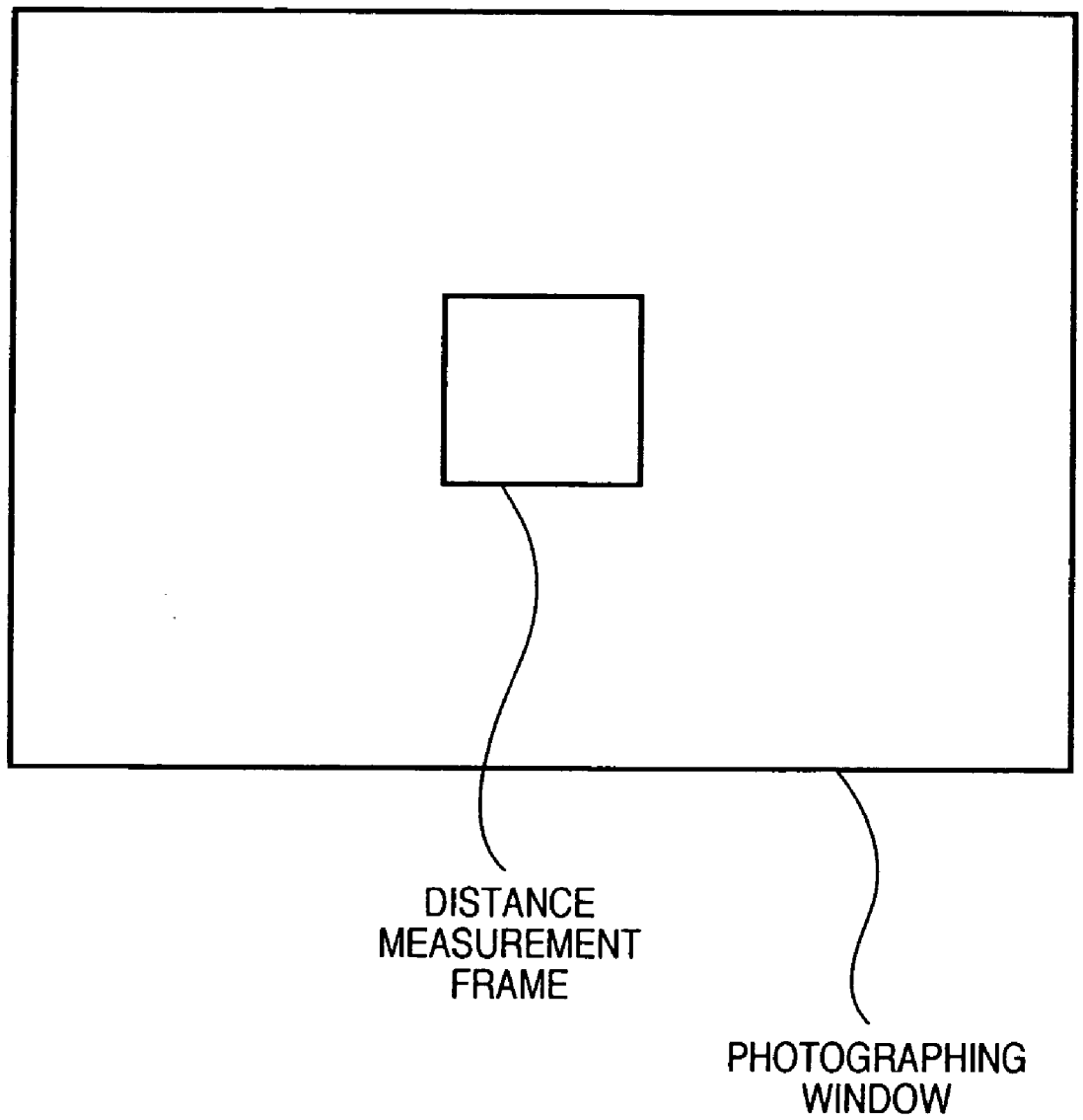
FIG. 12 is a view showing the distance measurement frame in the photographing window.
Figure 13:
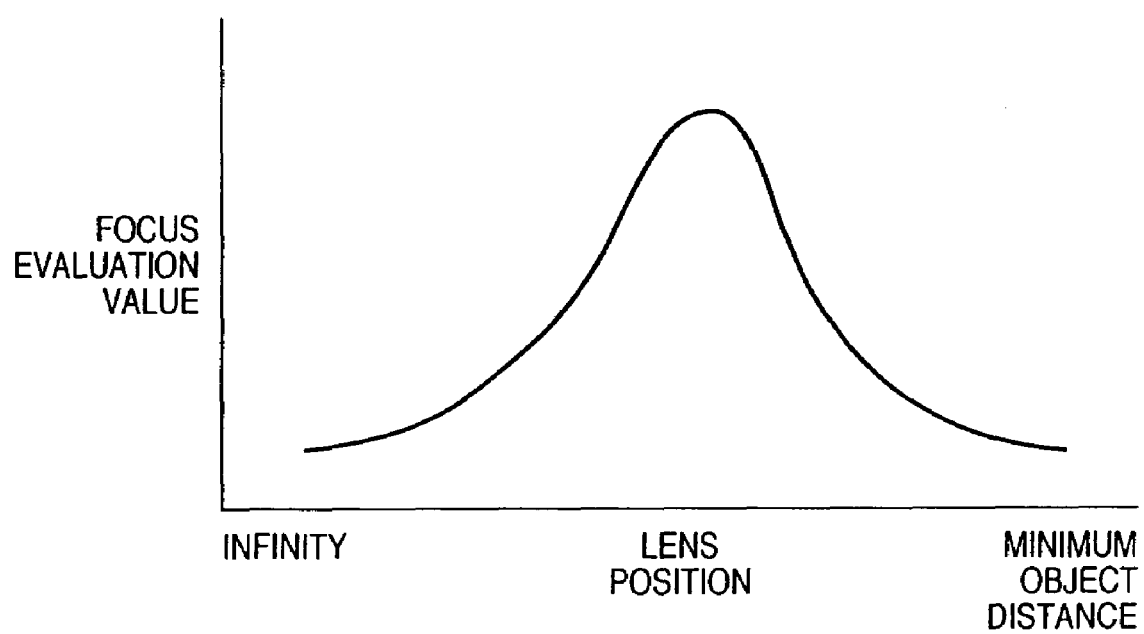
FIG. 13 is a graph showing the focus evaluation value to the focus lens position.

FIG. 10 corresponds to the flow chart for explaining setting of the distance measurement range in FIG. 6 according to the first embodiment. In step S1001, whether the focus mode has been set to manual focusing by a focus mode SW 130 is determined. If YES in step S1001, the flow advances to step S1002; if NO, to step S1009. In step S1002, whether the position of a zoom lens 108 is "wide" is determined. If YES in step S1002, the flow advances to step S1003; if NO, to step S1006.

In step S1003, the scan start position is set to PSW1. In step S1004, the scan end position is set to PEW1. In step S1005, the scan interval as a focus lens position interval for acquiring a focus evaluation value is set to SSW1.

In step S1006, the scan start position is set to PST1. In step S1007, the scan end position is set to PET1. In step S1008, the scan interval as a focus lens position interval for acquiring a focus evaluation value is set to SST1. PSW1, PEW1, SSW1, PST1, PET1, and SST1 will be described later.

In step S1009, the scan start position is set to PS2. In step S1010, the scan end position is set to PE2. In step S1011, the scan interval is set to SS2. PS2, PE2, and SS2 will also be described later.

PSW1, PEW1, PST1, PET1, PS2, and PE2 in steps S1003, S1004, S1006, S1007, S1009, and S1010 have a positional relationship as shown in FIG. 11. More specifically, PS2 is infinity in the focusable range, and PE2 is the minimum object distance. PSW1 is positioned closer to the minimum object distance than PS2, and PET1 is positioned closer to infinity than PE2. The distance measurement range from PSW1 to PEW1 is narrower than that from PS2 to PE2.

PST1 is positioned between PSW1 and PS2, and PET1 is positioned between PEW1 and PE2. The distance measurement range from PST1 to PET1 is wider than that from PSW1 to PEW1. When the zoom lens 108 is positioned at the wide-angle end, a narrow range is scanned; when the zoom lens 108 is not positioned at the wide-angle end, a relatively wide range is scanned. When the zoom lens 108 is not positioned at the wide-angle end, the moving amount of the object distance by which the lens becomes in focus is smaller even with the same moving amount of the focus lens 101 than that when the zoom lens 108 is positioned at the wide-angle end. From this, the scan range when the zoom lens 108 is not positioned at the wide-angle end is set larger than that when the zoom lens 108 is positioned at the wide-angle range. As a result, the same distance measurement range can be obtained regardless of the position of the zoom lens 108.

Further, the scan interval when the zoom lens 108 is positioned at the wide-angle end is set smaller than that when the zoom lens 108 is not positioned at the wide-angle end (SSW1<SST1). This setting can prevent prolongation of the distance measurement time even if the zoom lens 108 is not positioned at the wide-angle end and the scan range is relatively wide.

Functional blocks and processing sequences described in the above embodiments may be realized by hardware or by a microcomputer system including a CPU or MPU, ROM, RAM, and the like while realizing the operation in accordance with a work program stored in the ROM or RAM. The present invention also includes a case where a software program for realizing the function is supplied to the RAM so as to realize the function of each functional block and the functional block is caused to operate in accordance with the program.

In this case, the software program realizes the functions of the above-described embodiments. The program, and a means for supplying the program to a computer, such as a storage medium which stores the program constitute the present invention. The storage medium which stores the program includes a flexible disk, hard disk, optical disk, magneto-optical disk, CD-ROM, CD-I, CD-R, CD-RW, DVD, zip, magnetic tape, and nonvolatile memory card, in addition to the ROM and RAM.

The functions of the above-described embodiments are realized when the computer executes the supplied program. Also, the functions of the above-described embodiments are realized when the program is executed in cooperation with an OS (Operating System) or another application software running on the computer. Such program is included in the embodiments of the present invention.

Furthermore, the present invention includes a case where, after the supplied program is stored in the memory of the function expansion board of the computer or the memory of a function expansion unit connected to the computer, the CPU of the function expansion board or function expansion unit or the like performs part or all of actual processing on the basis of the instructions of the program and thereby implements the functions of the above-described embodiments.

As has been described above, according to the above-described embodiments, while the focus lens is driven within a predetermined range using the focus lens stop position as a reference in an autofocus apparatus of this type, an output from an extraction device is stored in association with the focus lens position, and whether focusing is capable is determined from the output from the extraction device. If focusing is determined from the determination result to be incapable, the focus lens is driven to the stop position. The focus lens can always be located at a proper position to sense a high-quality image.

As many apparently widely different embodiments of the present invention can be made without departing from the spirit and scope thereof, it is to be understood that the invention is not limited to the specific embodiments thereof except as defined in the appended claims.

What is claimed is:

1. An autofocus apparatus comprising:
    a first switch configured to instruct starting of a photographing preparation operation for driving a focus lens which performs a focus adjustment of an object;
    a photo-electric conversion device configured to convert an object image formed by the focus lens to an electric signal;
    an extraction device configured to extract a signal representing a contrast of the object from an output signal of said photo-electric conversion device;
    a focus lens driving instruction switch configured to instruct to manually drive the focus lens; and
    a controller configured to control the autofocus apparatus, wherein in case of autofocus mode, said controller controls so that the focus lens is driven within a first driving range by operation of said first switch, and wherein in case of a manual focus mode, the controller controls the focus lens to stop an in-focus position based on the output of said extraction device while driving the focus lens within a second driving range which is narrower than the first driving range in accordance with an operation of a second switch other than the first switch after the focus lens is driven in accordance with an operation of said focus lens driving instruction switch, and the focus lens is driven to a stop position which is caused by the operation of said focus lens driving instruction switch and is stored after the operation of said focus lens driving instruction switch, in a case that the in-focus position is not detected.

2. The apparatus according to claim 1, wherein an extraction result of said extraction device is stored in association with a position of the focus lens while the focus lens is driven.

3. The apparatus according to claim 1 further comprising a result notification device configured to notify a photographer of a focusing result, wherein said controller changes an output of said result notification device in accordance with the focus mode.

4. The apparatus according to claim 3, wherein said result notification device is a display device.

5. The apparatus according to claim 3, wherein said result notification device is a sound output device.

6. The apparatus according to claim 1 further comprising a zooming device configured to change a focal length of a lens system, wherein said controller changes a width of the second driving range based on the focal length.

* * * * *